US012657435B2

(12) United States Patent
Cao et al.

(10) Patent No.: US 12,657,435 B2
(45) Date of Patent: Jun. 16, 2026

(54) IMAGE PROCESSING METHOD AND APPARATUS FOR REPAIR PROCESSING ON A COLOR IMAGE

(71) Applicant: Shenzhen Yinwang Intelligent Technologies Co., Ltd., Shenzhen (CN)

(72) Inventors: Qi Cao, Hangzhou (CN); Xiaoli Zhang, Hangzhou (CN); Di Zhang, Hangzhou (CN); Haihang Zhang, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 325 days.

(21) Appl. No.: 18/341,617

(22) Filed: Jun. 26, 2023

(65) Prior Publication Data

US 2023/0342883 A1 Oct. 26, 2023

Related U.S. Application Data

(63) Continuation of application No. PCT/CN2021/123940, filed on Oct. 14, 2021.

(30) Foreign Application Priority Data

Dec. 30, 2020 (CN) .......................... 202011629186.9

(51) Int. Cl.
G06N 3/0455 (2023.01)
G06T 5/60 (2024.01)
(Continued)

(52) U.S. Cl.
CPC ............. G06N 3/0455 (2023.01); G06T 5/60 (2024.01); G06T 7/136 (2017.01); G06T 7/50 (2017.01);
(Continued)

(58) Field of Classification Search
CPC ...... G06N 3/0455; G06N 3/09; G06N 3/0464; G06N 3/084; G06N 3/045; G06T 5/60;
(Continued)

(56) References Cited

U.S. PATENT DOCUMENTS 8,059,913 B2 * 11/2011 Kwon ........................ G06T 5/92
382/167
9,275,443 B2 * 3/2016 Park ........................... G06T 5/90
(Continued)

FOREIGN PATENT DOCUMENTS

CN 106934779 A 7/2017
CN 106934836 * 7/2017
(Continued)

OTHER PUBLICATIONS

J. Chen and L.-P. Chau, "An enhanced window-variant dark channel prior for depth estimation using single foggy image," 2013 IEEE International Conference on Image Processing, Melbourne, VIC, Australia, 2013, pp. 3508-3512, doi: 10.1109/ICIP.2013.6738724. (Year: 2013).*

(Continued)

*Primary Examiner* — Andrae S Allison
(74) *Attorney, Agent, or Firm* — Leydig, Voit & Mayer, Ltd.

(57) ABSTRACT

This application provide an image processing method, and relate to the field of computer vision technologies, to perform repair processing on a color image in a fog/haze/smoke extreme weather condition. The image processing method includes: obtaining a first depth map and a color image, where the first depth map and the color image are images respectively shot by a depth sensor and a camera for a same scene; determining an atmospheric light value; performing depth completion on the first depth map to obtain a second depth map, and determining a transmittance based on the (Continued)

second depth map; and performing repair processing on the color image based on the atmospheric light value and the transmittance. The second depth map is used to determine the transmittance, and therefore, a transmittance of higher precision is obtained, thereby improving an image processing effect.

20 Claims, 5 Drawing Sheets

(51) Int. Cl.
| | |
|---|---|
| *G06T 7/136* | (2017.01) |
| *G06T 7/50* | (2017.01) |
| *G06T 7/90* | (2017.01) |

(52) U.S. Cl.
CPC ...... *G06T 7/90* (2017.01); *G06T 2207/10024* (2013.01); *G06T 2207/10028* (2013.01); *G06T 2207/20084* (2013.01); *G06T 2207/30192* (2013.01)

(58) Field of Classification Search
CPC .. G06T 7/136; G06T 7/50; G06T 7/90; G06T 2207/10024; G06T 2207/10028; G06T 2207/20084; G06T 2207/30192; G06T 5/73; G06T 2207/20081; G06T 3/4038; G06T 7/33; G06T 9/002; G06T 2200/32; G06T 5/77

See application file for complete search history.

(56) References Cited

U.S. PATENT DOCUMENTS

| | | | | |
|---|---|---|---|---|
| 2010/0259651 A1* | 10/2010 | Fattal | ........................ | G06T 5/73 |
| | | | | 348/241 |
| 2014/0140619 A1* | 5/2014 | Mukhopadhyay | ........ | G06T 5/40 |
| | | | | 382/167 |
| 2014/0205192 A1* | 7/2014 | Wang | ........................ | G06T 5/73 |
| | | | | 382/167 |
| 2016/0048742 A1* | 2/2016 | Huang | ...................... | G06T 5/40 |
| | | | | 382/159 |
| 2016/0196637 A1 | 7/2016 | Nguyen et al. | | |
| 2016/0238701 A1* | 8/2016 | Oh | ........................ | B60W 40/08 |
| 2017/0270408 A1* | 9/2017 | Shi | ........................... | G06N 3/08 |
| 2018/0225808 A1* | 8/2018 | Chakraborty | .......... | G06T 11/60 |
| 2020/0278431 A1* | 9/2020 | Zhu | ........................ | G01S 17/10 |

FOREIGN PATENT DOCUMENTS

| | | | |
|---|---|---|---|
| CN | 104794688 | * | 4/2019 |
| CN | 110097589 A | | 8/2019 |
| CN | 110136079 | * | 8/2019 |
| CN | 110136079 A | | 8/2019 |
| CN | 110310241 A | | 10/2019 |
| CN | 110910327 A | | 3/2020 |
| CN | 111091501 A | | 5/2020 |
| CN | 112001914 A | | 11/2020 |

OTHER PUBLICATIONS

Fangfa Fu, Yao Wang, Fengchang Lai, Weizhe Xu, Jinxiang Wang, "Efficient rain-fog model for rain detection and removal," J. Electron. Imaging 29(2), 023020 (2020), (Year: 2020).*

Jiang et al, Single Image Defogging Based on Improved Dark Channel Priority, International Conference on Industrial Technology and Management Science (ITMS 2015) (Year: 2015).*

Gao et al., "Image Dehazing Method Based on Light Field Depth Estimation and Atmospheric Scattering Model," Acta Photonica Sinica, vol. 49, No. 7, School of Computer and Information, total 24 pages (Jul. 2020). With an English translation.

AomanHao, "Sky Area Recognition for Image Processing," Blog Park, (Feb. 23, 2020), [online]https://www.cnblogs.com/AomanHao/p/14868665.html, total 8 pages (Feb. 23, 2020). With an English translation.

Linna, "Research on Image Dehazing Algorithm Based on Dark Channel Prior," Master's Thesis of Shandong Yanglun University (Academic Degree), Signal and Information Processing, Total 61 pages (Apr. 16, 2015). With an English translation.

* cited by examiner

200

IMAGE PROCESSING METHOD AND APPARATUS FOR REPAIR PROCESSING ON A COLOR IMAGE

CROSS-REFERENCE TO RELATED APPLICATIONS

This application is a continuation of International Application No. PCT/CN2021/123940, filed on Oct. 14, 2021, which claims priority to Chinese Patent Application No. 202011629186.9, filed on Dec. 30, 2020. The disclosures of the aforementioned applications are hereby incorporated by reference in their entireties.

TECHNICAL FIELD

The disclosure relates to an image processing method and apparatus, and a storage medium, and belongs to the field of image processing technologies.

BACKGROUND

In daily life, weather phenomena such as fog, haze, smoke, and rain may weaken an optical signal from an object, so that an image obtained by a camera is blurred, and practical value of the image in various fields is greatly affected. Therefore, it is quite necessary to propose a method to eliminate the influence of the weather phenomena such as fog, haze, smoke, and rain on image quality and increase image visibility.

Currently, most defogging/dehazing/desmoking algorithms are based on an atmospheric degradation model:

$$J(x) = \frac{I(x) - A(1 - t(x))}{t(x)} \tag{1}$$

Where (x) is an image with fog/haze/smoke and a to-be-repaired defogging/dehazing/desmoking image, (x) is a transmittance, and A is an atmospheric light value.

A defogging/dehazing/desmoking algorithm based on the atmospheric degradation model is to solve a transmittance (x) and an atmospheric light value A based on the image (x) with fog/haze/smoke, and finally to repair I(x) according to the foregoing formula (1), to obtain a repaired fog-free/haze-free/smoke-free image J(x).

For calculation of the transmittance (x), in a conventional method, the transmittance is determined mainly based on a to-be-repaired defogging/dehazing/desmoking color image. A powerful fitting capability of a neural network and a large amount of data are used first to train and fit a mapping function, and then the to-be-repaired defogging/dehazing/desmoking color image is mapped to the transmittance (x) by using the mapping function. Because a large amount of data is required for training and fitting the mapping function, the fitted mapping function is limited by scenarios in the data, and the mapping function is affected for extensive use. In addition, because accuracy of the fitted mapping function is limited, precision of a calculated transmittance is low. As a result, a quality of a repaired fog-free/haze-free/smoke-free image is poor.

SUMMARY

Embodiments of the disclosure provide an image processing method, in which completed depth information is integrated into a color image defogging/dehazing algorithm, to well resolve a problem of unclear shooting of an electronic device in a bad weather condition with low visibility. To achieve the foregoing objective, embodiments of the disclosure provide the following technical solutions.

According to a first aspect, an embodiment of the disclosure provides an image processing method. The image processing method includes the following steps:

obtaining a first depth map and a color image, where the first depth map and the color image are images respectively shot by a depth sensor and a camera for a same scene;

determining an atmospheric light value;

performing depth completion on the first depth map to obtain a second depth map, and determining a transmittance based on the second depth map; and performing repair processing on the color image based on the atmospheric light value and the transmittance.

Because a conventional manner of determining the transmittance by using a deep learning algorithm has a poor generalization capability, a restored image is not ideal. In this embodiment, the depth map is used to determine the transmittance, and the depth map is a depth map obtained after depth completion, so that precision of the transmittance can be improved, thereby improving an image processing effect.

In an implementation, the performing depth completion on the first depth map to obtain a second depth map includes:

providing the color image and a second intermediate feature image for a first deep neural network to obtain a third depth map, where the second intermediate feature image is a feature image generated at an intermediate layer of a second deep neural network;

providing the first depth map and a first intermediate feature image for the second deep neural network to obtain a fourth depth map, where the first intermediate feature image is a feature image generated at an intermediate layer of the first depth neural network; and performing a fusion operation on the third depth map and the fourth depth map to obtain the second depth map.

It can be learned from the foregoing that, by performing deep inference on the color image and the feature image generated at the intermediate layer of the second neural network by using the first deep neural network, a third depth map with full depth information can be obtained by fully mining and using color image information; and by performing deep inference on the first depth map and the feature image generated at the intermediate layer of the first depth neural network by using the second deep neural network, a fourth depth map with full depth information can be obtained by fully mining and using the first depth map. Then the third depth map with full depth information and the fourth depth map with full depth information are fused (or merged) to obtain a complete depth map with high quality, that is, the second depth map.

In an implementation, the first deep neural network includes a first preprocessing network, a first encoder, and a first decoder, the first preprocessing network is configured to transform a color image that is input to the first deep neural network into a first feature image suitable for processing by the first encoder, the first encoder is configured to perform feature encoding on the first feature image, and the first decoder is configured to perform feature decoding on a second feature image that is output by the first encoder.

In an implementation, the first intermediate feature image includes a feature image generated at a convolutional layer in an encoding unit of the first encoder and a feature image generated at an upsampling layer in a decoding unit of the first decoder.

In an implementation, the second deep neural network includes a second preprocessing network, a second encoder, and a second decoder, the second preprocessing network is configured to transform a first depth map that is input to the second deep neural network into a third feature image suitable for processing by the second encoder, the second encoder is configured to perform feature encoding on the third feature image, and the second decoder is configured to perform feature decoding on a fourth feature image that is output by the second encoder.

In an implementation, the second intermediate feature image includes a feature image generated at a convolutional layer in an encoding unit of the second encoder and a feature image generated at an upsampling layer in a decoding unit of the second decoder.

In an implementation, the determining an atmospheric light value includes:

determining the atmospheric light value based on the first depth map.

In an implementation, the determining the atmospheric light value based on the first depth map includes:

determining, from the first depth map, a sky depth map used to indicate a sky region; and determining the atmospheric light value based on the sky depth map and the color image.

The sky region can be more accurately identified based on the sky depth map segmented from the first depth map by using the depth information of the first depth map, thereby avoiding color interference for a measured object, especially for a white region, and effectively calculating the atmospheric light value.

In an implementation, the determining, from the first depth map, a sky depth map used to indicate a sky region includes:

determining the sky depth map from the first depth map by using a sliding window method.

In an implementation, a shape of a sliding window used in the sliding window method is a rectangle with a size of one row of pixels, and a step size of the sliding window is 1.

In an implementation, the determining the atmospheric light value based on the sky depth map and the color image includes:

determining, from the color image by using the sky depth map, a sky color image used to indicate the sky region; and determining the atmospheric light value based on the sky color image.

In an implementation, the determining, from the color image by using the sky depth map, a sky color image used to indicate the sky region includes:

performing a binarization operation on the first depth map by using the sky depth map, to obtain a binary map; and determining, based on the binary map and the color image, the sky color image used to indicate the sky region.

In an implementation, the determining the atmospheric light value based on the sky color image includes:

determining pixel points of a brightest part from the sky color image; and determining an average value of the pixel points of the brightest part as the atmospheric light value.

According to a second aspect, an embodiment of this application further provides an image processing method, the method includes:

obtaining a first depth map and a color image, where the first depth map and the color image are images respectively shot by a depth sensor and a camera for a same scene;

determining the atmospheric light value based on the first depth map;

determining a transmittance based on the first depth map; and performing repair processing on the color image based on the atmospheric light value and the transmittance.

In an implementation, the determining the atmospheric light value based on the first depth map includes:

determining, from the first depth map, a sky depth map used to indicate a sky region; and determining the atmospheric light value based on the sky depth map and the color image.

In an implementation, the determining, from the first depth map, a sky depth map used to indicate a sky region includes:

determining the sky depth map from the first depth map by using a sliding window method.

In an implementation, the determining the atmospheric light value based on the sky depth map and the color image includes:

determining, from the color image by using the sky depth map, a sky color image used to indicate the sky region; and determining the atmospheric light value based on the sky color image.

According to a third aspect, an embodiment of this application further provides an image processing apparatus, including:

an image obtaining module, configured to obtain a first depth map and a color image, where the first depth map and the color image are images respectively shot by a depth sensor and a camera for a same scene; an atmospheric light value calculation module, configured to calculate an atmospheric light value; and a transmittance calculation module, configured to: perform depth completion on the first depth map to obtain a second depth map, and determine a transmittance based on the second depth map.

In an implementation, the transmittance calculation module is configured to: provide the color image and a second intermediate feature image for a first deep neural network to obtain a third depth map, where the second intermediate feature image is a feature image generated at an intermediate layer of a second deep neural network; provide the first depth map and a first intermediate feature image for the second deep neural network to obtain a fourth depth map, where the first intermediate feature image is a feature image generated at an intermediate layer of the first depth neural network; and perform a fusion operation on the third depth map and the fourth depth map to obtain the second depth map.

In an implementation, the atmospheric light value calculation module is configured to determine the atmospheric light value based on the first depth map.

In an implementation, the atmospheric light value calculation module is configured to: determine, from the first depth map, a sky depth map used to indicate a sky region; and determine the atmospheric light value based on the sky depth map and the color image.

In an implementation, the atmospheric light value calculation module is configured to determine the sky depth map from the first depth map by using a sliding window method.

In an implementation, the atmospheric light value calculation module is configured to: determine, from the color image by using the sky depth map, a sky color image used to indicate the sky region; and determine the atmospheric light value based on the sky color image.

According to a fourth aspect, an embodiment of this application further provides an image processing apparatus, including:

an image obtaining module, configured to obtain a first depth map and a color image, where the first depth map and the color image are images respectively shot by a depth sensor and a camera for a same scene; an atmospheric light value calculation module, configured to determine an atmospheric light value based on the first depth map; a transmittance calculation module, configured to determine a transmittance based on the first depth map; and an image repair module, configured to determine a repaired image based on the atmospheric light value and the transmittance.

In an implementation, the atmospheric light value calculation module is configured to: determine, from the first depth map, a sky depth map used to indicate a sky region; and determine the atmospheric light value based on the sky depth map and the color image.

In an implementation, the atmospheric light value calculation module is configured to determine the sky depth map from the first depth map by using a sliding window method.

In an implementation, the atmospheric light value calculation module is configured to: determine, from the color image by using the sky depth map, a sky color image used to indicate the sky region; and determine the atmospheric light value based on the sky color image.

According to a fifth aspect, an embodiment of this application further provides an image processing apparatus, where the image processing apparatus may be a processor, for example, a graphics processing unit (GPU), a neural-network processing unit (NPU), or an advanced reduced instruction set computing machine (ARM). Optionally, the image processing apparatus further includes a memory. The memory is configured to store a computer program or an instruction. The processor is coupled to the memory. When the processor executes the computer program or the instruction, the image processing apparatus performs the method performed by the processor in the foregoing method embodiments.

According to a sixth aspect, this application provides a computer-readable storage medium. The computer-readable storage medium stores a computer program, and when the computer program is run, the method performed by the processor in the first aspect or the second aspect is implemented.

According to a seventh aspect, a computer program product including an instruction is provided. When the computer program product runs on a computer, the computer is enabled to perform the method in any implementation of the first aspect or the second aspect.

According to an eighth aspect, a chip is provided. The chip includes a processor and a data interface. The processor performs the method in any implementation of the first aspect or the second aspect by reading, through the data interface, an instruction stored in a memory.

In this application, names of the processor and the image processing apparatus constitute no limitation on the devices. In actual implementation, these devices may have other names. Provided that functions of the devices are similar to those in this application, the devices fall within the scope of the claims of this application and equivalent technologies thereof.

DESCRIPTION OF EMBODIMENTS

Figure 1:
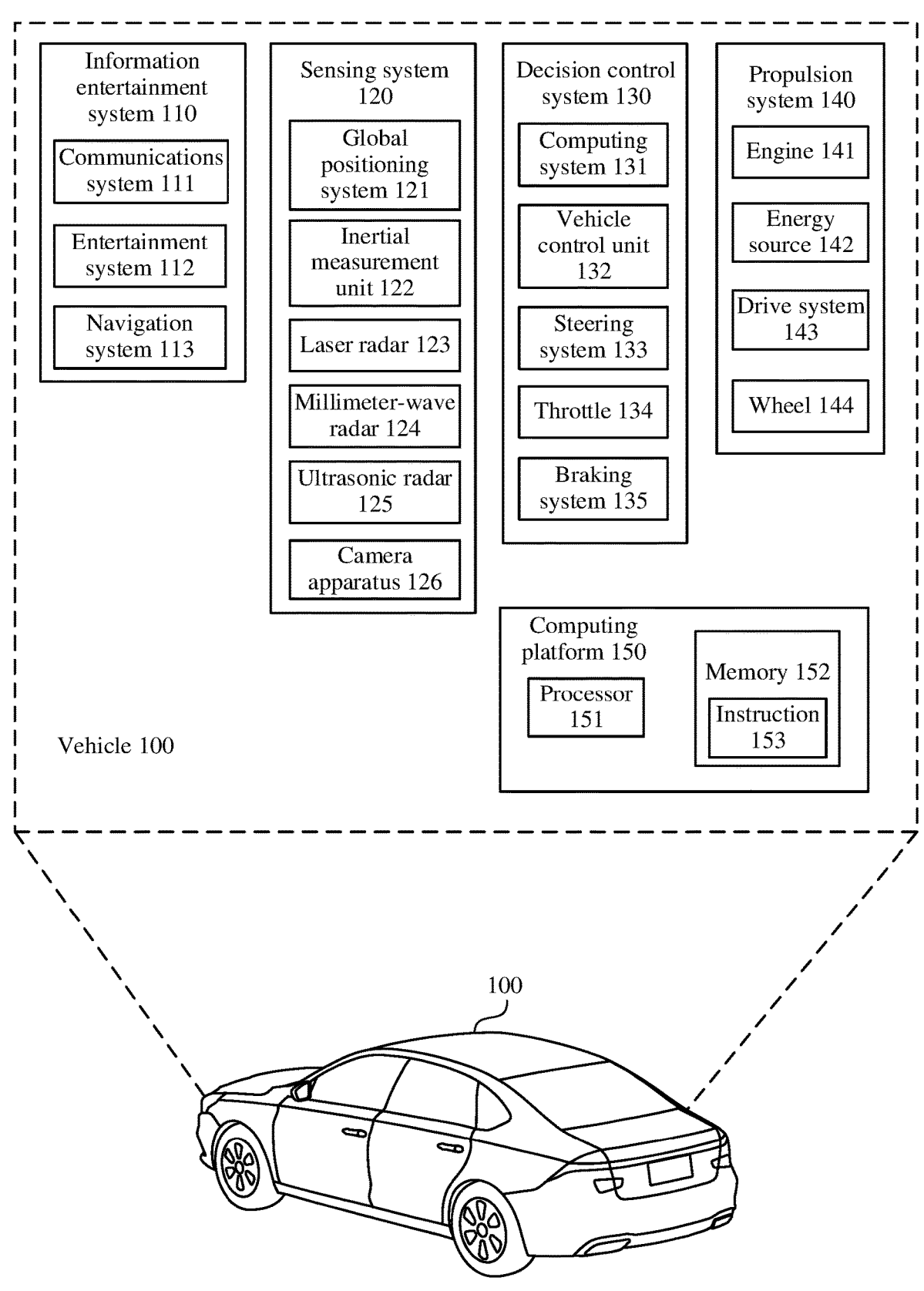
FIG. 1 is a diagram of a vehicle 100 according to an embodiment of this application.

The following describes embodiments of the disclosure with reference to the accompanying drawings in embodiments of the disclosure.

In the specification, claims, and accompanying drawings of this application, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular feature, structure, or characteristic described with reference to this embodiment may be included in at least one embodiment of this application. The phrase shown in various locations in this specification may not necessarily refer to a same embodiment, and is not an independent or optional embodiment exclusive from another embodiment. It is explicitly and implicitly understood by a person skilled in the art that embodiments described in this specification may be combined with another embodiment.

Some terms in this application are first described, to help a person skilled in the art have a better understanding.

1. Depth map: the depth map may also be referred to as a distance image, and each pixel value in the depth map reflects a distance between a depth sensor and an object.

2. Color image: the color images are mainly classified into two types: RGB and CMYK. An RGB color image includes three different color components: red, green, and blue. A CMYK image includes four color components: cyan C, light M, yellow Y, and black K. The CMYK image is mainly used in a printing industry.

3. Registration: registration in this application refers to image registration, and image registration is a process of converting different images in a same scene into a same coordinate system. These images may be shot at different times (multi-time registration), may be shot by different sensors (multi-mode registration), and may be shot at different angles of view. A spatial relationship between these images may be rigid (translation and rotation) or affine (for example, shear), may be in homography, or may be a complex large deformation model.

In this application, the color image and the depth map are usually registered. Therefore, there is a one-to-one correspondence between pixel points of the color image and pixel points of the depth map.

4. Depth completion: generally, it refers to complete a sparse depth map into a dense depth map, and a quantity of non-zero pixels included in a completed dense depth map is greater than a quantity of non-zero pixels included in the sparse depth map.

This application mainly relates to an image processing method. In the image processing method, repair processing is mainly performed on a color image by using depth information in a depth map, to obtain an enhanced color image. For example, for a color image that includes interference information such as smoke, fog, or haze, defogging/dehazing/desmoking may be implemented by using the image processing method in this application. In other words, the enhanced color image is a color image obtained after defogging/dehazing/desmoking.

Before an image processing method is described, a scenario to which the technical solutions of this application are applicable is first described.

Scenario 1: Vehicle-Mounted Sensing

FIG. 1 is a diagram of a vehicle 100 according to an embodiment of this application. The vehicle 100 may be configured to be in a full or partial automatic driving mode. For example, the vehicle 100 may obtain surrounding environment information of the vehicle 100 by using a sensing system 120, and obtain an automatic driving policy based on analysis of the surrounding environment information, to implement full-automatic driving, or present an analysis result to a user, to implement partial automatic driving.

The vehicle 100 may include various subsystems, such as an information entertainment system 110, a sensing system 120, a decision control system 130, a propulsion system 140, and a computing platform 150. Optionally, the vehicle 100 may include more or fewer subsystems, and each subsystem may include a plurality of components. In addition, each subsystem and component of the vehicle 100 may be interconnected in a wired or wireless manner.

In some embodiments, the information entertainment system 110 may include a communications system 111, an entertainment system 112, and a navigation system 113.

The communications system 111 may include a wireless communications system, and the wireless communications system may communicate with one or more devices in wireless manner directly or by using a communications network. For example, the wireless communications system may perform communication through a 3G cellular network such as CDMA, EVDO, or a GSM/GPRS, perform communication through a 4G cellular network such as LTE, or perform communication through a 5G cellular network. The wireless communications system may communicate with a wireless local area network (WLAN) by using Wi-Fi. In some embodiments, the wireless communications system, for example, various vehicle communications systems, may directly communicate with a device through an infrared link, Bluetooth, or ZigBee, or other wireless protocols. For example, the wireless communications system may include one or more dedicated short range communications (DSRC) devices, and these devices may include public and/or private data communications between vehicles and/or roadside stations.

The entertainment system 112 may include a central control screen, a microphone, and a sounder. A user may listen to radio and play music in a vehicle through the entertainment system. Alternatively, a mobile phone is connected to a vehicle, to realize screen projection of the mobile phone on the central control screen. The central control screen may be a touchscreen, and the user may perform an operation by touching the screen. In some cases, a voice signal of a user may be obtained by using the microphone, and some control performed by the user on the vehicle 100 is implemented based on analysis of the voice signal of the user, for example, a temperature inside the vehicle is adjusted. In other cases, music may be played for the user by using the sounder.

The navigation system 113 may include a map service provided by a map supplier, to provide navigation of a driving route for the vehicle 100. The navigation system 113 may be used together with a global positioning system 121 and an inertial measurement unit 122 of the vehicle. The map service provided by the map provider may be a two-dimensional map or a high-precision map.

The sensing system 120 may include several types of sensors that sense the surrounding environment information of the vehicle 100. For example, the sensing system 120 may include the global positioning system 121 (the global positioning system may be a GPS system, or may be a COMPASS system or another positioning system), the inertial measurement unit (IMU) 122, a laser radar 123, a millimeter-wave radar 124, an ultrasonic radar 125, and a camera apparatus 126. The camera apparatus 126 may also be referred to as a camera. The sensing system 120 may further include sensors (for example, an in-vehicle air quality monitor, a fuel gauge, and an oil temperature gauge) of an internal system of the vehicle 100 that is monitored. Sensor data from one or more of these sensors can be used to detect an object and corresponding features (a position, a shape, a direction, a speed, and the like) of the object. Such detection and recognition are key functions of safe operation of the vehicle 100.

The global positioning system 121 may be configured to estimate a geographical location of the vehicle 100.

The inertial measurement unit 122 is configured to sense a position and an orientation change of the vehicle 100 based on inertial acceleration. In some embodiments, the inertial measurement unit 122 may be a combination of an accelerometer and a gyroscope.

The laser radar 123 may sense, by using a laser, an object in an environment in which the vehicle 100 is located. In some embodiments, the laser radar 123 may include one or more laser sources, a laser scanner, one or more detectors, and other system components.

The millimeter-wave radar 124 may sense an object in a surrounding environment of the vehicle 100 by using a radio signal. In some embodiments, in addition to sensing an object, the millimeter-wave radar 124 may further be configured to sense a speed and/or a moving direction of the object.

The ultrasonic radar 125 may sense an object around the vehicle 100 by using an ultrasonic signal.

The camera apparatus 126 may be configured to capture image information of the surrounding environment of the vehicle 100. The camera apparatus 126 may include a monocular camera, a binocular camera, a structured light camera, a panorama camera, and the like. The image information obtained by the camera apparatus 126 may include a static image, or may include video stream information.

A depth map and a color image may be obtained by using a sensor deployed in the sensing system 120. For example, a depth map and a color image that are in a same scene are obtained by using the laser radar 123 and the camera apparatus 126 respectively.

The decision control system 130 includes a computing system 131 that performs analysis and decision-making based on information obtained by the sensing system 120. The decision control system 130 further includes a vehicle control unit 132 that controls a power system of the vehicle 100, and a steering system 133, a throttle 134, and a braking system 135 that are configured to control the vehicle 100.

The computing system 131 may operate to process and analyze various information obtained by the sensing system 120 to identify a target, an object, and/or a feature in the surrounding environment of the vehicle 100. The target may include a pedestrian or an animal, and the object and/or the feature may include a traffic signal, a road boundary, and an obstacle. The computing system 131 may use technologies such as an object recognition algorithm, a structure from motion (SFM) algorithm, and video tracking. In some embodiments, the computing system 131 may be configured to: map an environment, track an object, estimate a speed of an object, and the like. The computing system 131 may analyze the obtained various information and obtain a control policy for the vehicle.

The vehicle control unit 132 may be configured to coordinate and control a power battery and an engine 141 of the vehicle, to improve power performance of the vehicle 100.

The steering system 133 may be operated to adjust a moving direction of the vehicle 100. For example, in an embodiment, the steering system 133 may be a steering wheel system.

The throttle 134 is configured to control an operating speed of the engine 141 and control a speed of the vehicle 100.

The braking system 135 is configured to control the vehicle 100 to decelerate. The braking system 135 may slow down a wheel 144 by using a friction force. In some embodiments, the braking system 135 may convert kinetic energy of the wheel 144 into a current. The braking system 135 may also slow down a rotation speed of the wheel 144 by using other forms, to control the speed of the vehicle 100.

The propulsion system 140 may include a component that provides power for the vehicle 100 to move. In an embodiment, the propulsion system 140 may include an engine 141, an energy source 142, a transmission 143, and a wheel 144. The engine 141 may be an internal combustion engine, an electric motor, an air compression engine, or a combination of other types of engines, for example, a hybrid engine formed by a gasoline engine and an electric motor, or a hybrid engine formed by an internal combustion engine and an air compression engine. The engine 141 converts the energy source 142 into mechanical energy.

Examples of the energy source 142 include gasoline, diesel, other oil-based fuels, propane, other compressed gas-based fuels, ethyl alcohol, solar panels, batteries, and other power sources. The energy source 142 may also provide energy for another system of the vehicle 100.

The transmission 143 may transmit mechanical power from the engine 141 to the wheel 144. The transmission 143 may include a gearbox, a differential, and a drive shaft. In an embodiment, the transmission 143 may further include another component, for example, a clutch. The drive shaft may include one or more shafts that may be coupled to one or more wheels 144.

Some or all functions of the vehicle 100 are controlled by the computing platform 150. The computing platform 150 may include at least one processor 151, and the processor 151 may execute an instruction 153 stored in a non-transitory computer readable medium such as a memory 152. In some embodiments, the computing platform 150 may alternatively be a plurality of computing devices that control individual components or subsystems of the vehicle 100 in a distributed manner.

The processor 151 may be any conventional processor, such as a commercially available CPU. Alternatively, the processor 151 may further include a graphic process unit (GPU), a field programmable gate array (FPGA), a system on chip (SoC), an application-specific integrated circuit (ASIC), or a combination thereof. Although FIG. 1 functionally illustrates a processor, a memory, and other components of a computer 110 in a same block, a person of ordinary skill in the art should understand that the processor, the computer, or the memory may actually include a plurality of processors, computers, or memories that may or may not be stored in a same physical housing. For example, the memory may be a hard disk drive, or another storage medium located in a housing different from that of the computer 110. Thus, it is understood that a reference to the processor or the computer includes a reference to a set of processors or computers or memories that may or may not operate in parallel. Different from using a single processor to perform the steps described herein, some components such as a steering component and a deceleration component may include respective processors. The processor performs only computation related to a component-specific function.

In various aspects described herein, the processor may be located far away from the vehicle and wirelessly communicate with the vehicle. In another aspect, some processes described herein are performed on a processor disposed inside the vehicle, while others are performed by a remote processor, including performing steps necessary for single manipulation.

In some embodiments, the memory 152 may include an instruction 153 (for example, program logic), and the instruction 153 may be executed by the processor 151 to perform various functions of the vehicle 100. The memory 152 may also include additional instructions, including instructions used to send data to, receive data from, interact with, and/or control one or more of the information entertainment system 110, the sensing system 120, the decision control system 130, and the propulsion system 140.

In addition to the instruction 153, the memory 152 may further store data, such as a road map, route information, a position, a direction, a speed, and other vehicle data of the vehicle, and other information. This information may be used by the vehicle 100 and the computing platform 150 during operation of the vehicle 100 in autonomous, semi-autonomous, and/or manual modes.

The computing platform 150 may control the functions of the vehicle 100 based on inputs received from various subsystems (for example, the propulsion system 140, the sensing system 120, and the decision control system 130). For example, the computing platform 150 may utilize input from the decision control system 130 to control the steering system 133 to avoid obstacles detected by the sensing system 120. In some embodiments, the computing platform 150 may operate to provide control over many aspects of the vehicle 100 and the subsystems of the vehicle 100.

In this embodiment, the computing platform 150 may obtain the depth map and the color image from the sensing system 120, and perform repair processing on the color image by using depth information in the depth map, to obtain an enhanced color image. The repair processing may be stored in the memory 152 in a form of software, and the processor 151 invokes the instruction 153 in the memory 152 to perform the repair processing. After obtaining the enhanced color image, the computing platform 150 may output the enhanced color image to another system for further processing. For example, the enhanced color image is output to the information entertainment system 110 for a driver to observe the enhanced color image, or the enhanced color image is output to the decision control system 130 for related decision processing.

Optionally, one or more of the foregoing components may be installed separately from or associated with the vehicle 100. For example, the memory 152 may exist partially or completely separate from the vehicle 100. The foregoing components may be communicatively coupled together in a wired and/or wireless manner.

Optionally, the foregoing components are merely examples. During actual application, components in the foregoing modules may be added or removed based on an actual requirement. FIG. 1 should not be construed as a limitation on this embodiment of this application.

An autonomous vehicle traveling on a road, for example, the vehicle 100, may identify an object in a surrounding environment of the autonomous vehicle, to determine to adjust a current speed. The object may be another vehicle, a traffic control device, or another type of object. In some examples, each identified object may be considered independently, and features of each object, such as a current speed of the object, acceleration of the object, and a spacing between the object and the vehicle may be used to determine the speed to be adjusted by the autonomous vehicle.

Optionally, the vehicle 100 or a sensing and computing device (for example, the computing system 131 and the computing platform 150) associated with the vehicle 100 may predict a behavior of the identified object based on the features of the identified object and a state of the surrounding environment (for example, traffic, rain, and ice on the road). Optionally, all identified objects depend on behavior of each other, and therefore all the identified objects may be considered together to predict a behavior of a single identified object. The vehicle 100 can adjust the speed of the vehicle 100 based on the predicted behavior of the identified object. In other words, the autonomous vehicle can determine, based on the predicted behavior of the object, a stable state to which the vehicle needs to be adjusted (for example, acceleration, deceleration, or stop). In this process, another factor may also be considered to determine the speed of the vehicle 100, for example, a horizontal position of the vehicle 100 on a road on which the vehicle travels, curvature of the road, and proximity between a static object and a dynamic object.

In addition to providing an instruction for adjusting the speed of the autonomous vehicle, the computing device may further provide an instruction for modifying a steering angle of the vehicle 100, so that the autonomous vehicle follows a given track and/or maintains safe lateral and longitudinal distances between the autonomous vehicle and an object (for example, a car in an adjacent lane on the road) near the autonomous vehicle.

The vehicle 100 may be a car, a truck, a motorcycle, a bus, a boat, an airplane, a helicopter, a lawn mower, a recreational vehicle, a playground vehicle, a construction device, a trolley, a golf cart, a train, or the like. This is not limited in the embodiments of this application.

Scenario 2: Terminal Shooting

Figure 2:
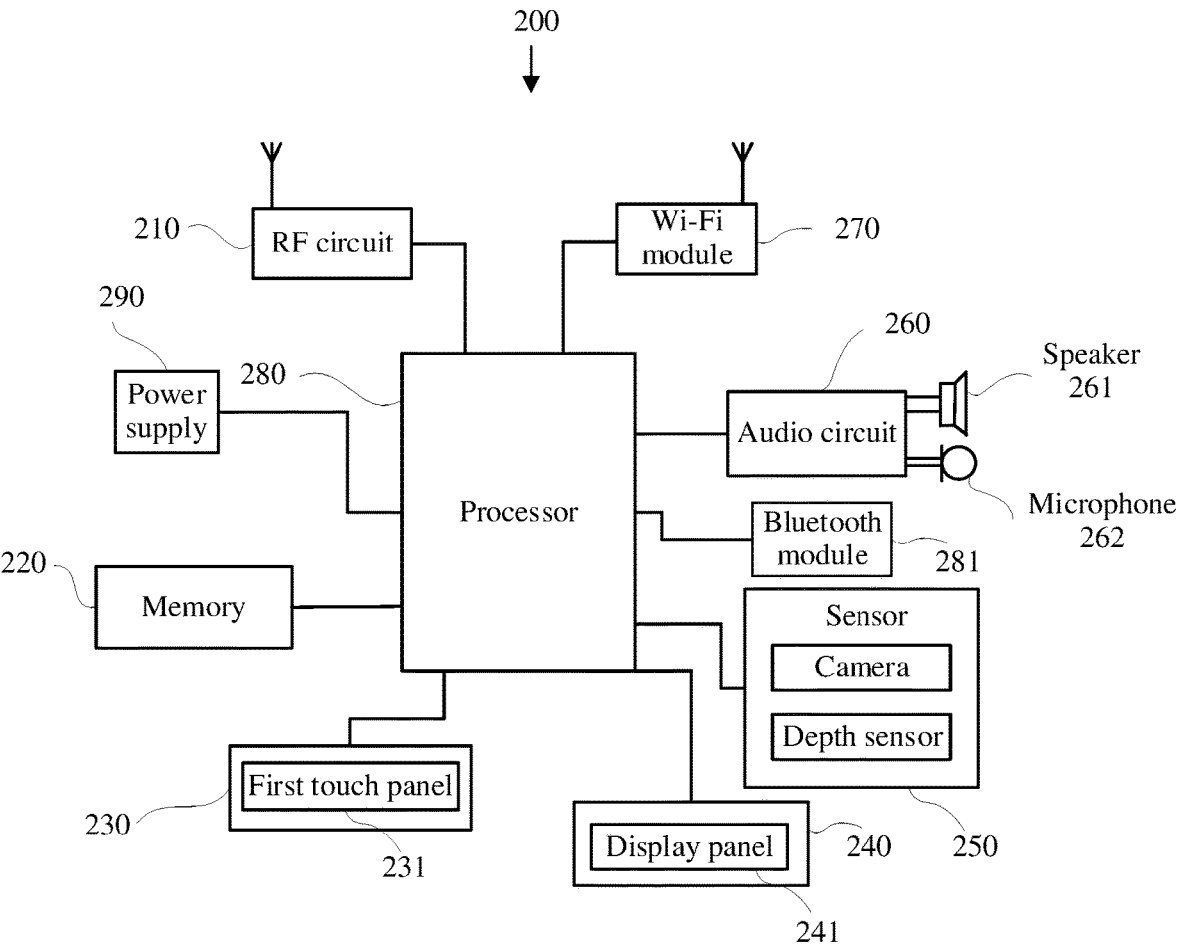
FIG. 2 is a diagram of a mobile phone 200 according to an embodiment of this application.

FIG. 2 is a diagram of a structure of a mobile phone 200 according to an embodiment of this application. The mobile phone 200 is merely an example of a terminal, and the mobile phone 200 may have more or fewer components than those shown in FIG. 2, or may combine two or more components, or may have different component configurations. The components shown in FIG. 2 may be implemented in hardware including one or more signal processing and/or application-specific integrated circuits, software, or a combination of hardware and software.

As shown in FIG. 2, the mobile phone 200 includes components such as an RF (radio frequency) circuit 210, a memory 220, an input unit 230, a display unit 240, a sensor 250, an audio circuit 260, a Wireless Fidelity (Wi-Fi) module 270, a processor 280, and a power supply. A person skilled in the art may understand that the structure of the mobile phone shown in FIG. 2 does not constitute a limitation on the mobile phone, and the mobile phone may include more or fewer components than those shown in the figure, or combine some components, or have different component arrangements.

The following describes the components of the mobile phone 200 in detail with reference to FIG. 2.

The RF circuit 210 may be configured to receive and send a signal in a process of receiving and sending information or in a call process. After receiving downlink information of a base station, the RF circuit 210 may send the downlink information to the processor 280 for processing. In addition, the RF circuit 210 sends related uplink data to the base station. Generally, the RF circuit includes, but is not limited to, devices such as an antenna, at least one amplifier, a transceiver, a coupler, a low noise amplifier, and a duplexer. Additionally, the RF circuit 210 may further communicate with a network and another mobile device through wireless communication. The wireless communication may use any communication standard or protocol, including but not limited to a global system for mobile communications, a general packet radio service, code division multiple access, wideband code division multiple access, long term evolution, an e-mail message, a short message service, and the like.

The memory 220 may be configured to store a software program and data. The processor 280 runs the software program and the data that are stored in the memory 220, to perform various functions and data processing of the mobile phone 200. The memory 220 may mainly include a program storage area and a data storage area. The program storage area may store an operating system, an application program required by at least one function (for example, a sound play function or an image play function), and the like. The data storage area may store data (for example, audio data or a phone book) created based on use of the mobile phone 200, and the like. In addition, the memory 220 may include a high-speed random access memory, or may include a non-volatile memory such as at least one magnetic disk storage device, a flash storage device, or another volatile solid-state storage device. In the following embodiment, the memory 220 stores an operating system that enables the mobile phone 200 to run, for example, an iOS® operating system developed by Apple Inc., an Android® open source operating system developed by Google LLC, or a Windows® operating system developed by Microsoft Corporation.

The input unit 230 (for example, a touchscreen) may be configured to: receive entered numeric or character information, and generate a signal input related to user setting and function control of the mobile phone 200. The input unit 230 may include a touch panel 231 disposed on a front surface of the mobile phone 200 and shown in FIG. 1, may collect a touch operation of a user on or close to the touch panel 231 (such as an operation of the user on or close to the touch panel 231 by using any suitable object or accessory such as a finger or a stylus), and drive a corresponding connection apparatus based on a preset program. Optionally, the touch panel 231 may include two parts: a touch detection apparatus and a touch controller (not shown in FIG. 2). The touch detection apparatus detects a touch orientation of the user, detects a signal generated by a touch operation, and transmits the signal to the touch controller. The touch controller receives touch information from the touch detection apparatus, converts the touch information into touchpoint coordinates, and sends the touchpoint coordinates to the processor 280, and can receive an instruction sent from the processor 280 and execute the instruction. In addition, the touch panel 231 may be implemented in a plurality of types, such as a resistive type, a capacitive type, an infrared type, and a surface acoustic wave type.

The display unit 240 (that is, a display screen) may be configured to display information entered by the user or information provided for the user, and a graphical user interface (GUI) of various menus of the mobile phone 200. The display unit 240 may include a display panel 241 that is disposed in the front of the mobile phone 200. The display panel 241 may be configured in a form of a liquid crystal display, a light-emitting diode, or the like.

The mobile phone 200 may further include at least one type of sensor 250, such as a camera apparatus, a depth sensor, a light sensor, a motion sensor, and another sensor. The camera apparatus may be a color camera, configured to shoot a color image. The depth sensor may be configured to determine depth information from the mobile phone 200 to an object. The light sensor may include an ambient light sensor and a proximity sensor. As a type of motion sensor, an accelerometer sensor may detect magnitudes of accelerations in various directions (usually, three axes), may detect a magnitude and a direction of gravity when the mobile phone 200 is stationary, and may be used in an application used for recognizing a mobile phone posture (such as landscape-portrait mode switching, a related game, or magnetometer posture calibration), a vibration recognition-related function (such as a pedometer function or tapping), and the like. For another sensor that may be disposed in the mobile phone 200, such as a gyroscope, a barometer, a hygrometer, a thermometer, or an infrared sensor, details are not described herein.

The audio circuit 260, a speaker 261, and a microphone 262 may provide an audio interface between the user and the mobile phone 200. The audio circuit 260 may convert received audio data into an electrical signal and transmit the electrical signal to the speaker 261, and the speaker 261 converts the electrical signal into a sound signal for output. Additionally, the microphone 262 converts a collected sound signal into an electrical signal, and the audio circuit 260 receives the electrical signal, converts the electrical signal into audio data, and then outputs the audio data to the RF circuit 210, to send the audio data to, for example, another phone, or outputs the audio data to the memory 220 for further processing.

Wi-Fi is a short-range wireless transmission technology. The mobile phone 200, by using a Wi-Fi module 270, may help the user receive and send an email, browse a web page, access streaming media, and the like. The Wi-Fi module 270 provides wireless access to the broadband Internet for the user.

The processor 280 is a control center of the mobile phone 200, and is connected to various parts of the entire phone by using various interfaces and lines. By running or executing the software program stored in the memory 220 and invoking the data stored in the memory 220, the processor 280 performs various functions and data processing of the mobile phone 200, to perform overall monitoring on the mobile phone. In some embodiments, the processor 280 may include one or more processing units. The processor 280 may further integrate an application processor and a modem processor. The application processor mainly processes an operating system, a user interface, an application program, and the like. The modem processor mainly processes wireless communication. It may be understood that the foregoing modem processor may not be integrated into the processor 180.

In this embodiment, the processor 280 obtains a depth map and a color image from the sensor 250, and performs repair processing on the color image by using depth information in the depth map, to obtain an enhanced color image. The implementation of the repair processing may be stored in the memory 220 in a form of software, and the processor 280 invokes the instruction in the memory 220 to perform the repair processing. After obtaining the enhanced color image, the processor 280 may output the enhanced color image to another system for further processing, for example, output the enhanced color image to the display unit 240 for the user to view the enhanced color image.

A Bluetooth module 281 is configured to exchange information with another device by using a short-range communications protocol such as Bluetooth. For example, the mobile phone 200 may establish, by using the Bluetooth module 281, a Bluetooth connection to a wearable electronic device (for example, a smartwatch) that also has a Bluetooth module, to exchange data.

The mobile phone 200 further includes a power supply 290 (such as a battery) that supplies power to each component. The power supply may be logically connected to the processor 280 by using a power supply management system, to implement functions such as charging, discharging, and power consumption management by using the power supply management system. It may be understood that, in the following embodiments, the power supply 290 may be configured to supply power to the display panel 241 and the touch panel 231.

It should be noted that the foregoing merely describes two scenarios as an example. This application does not limit another applicable scenario that is not described in this application. For example, this application may be further applied to another computer vision scenario such as a surveillance and control scenario.

Figure 3:
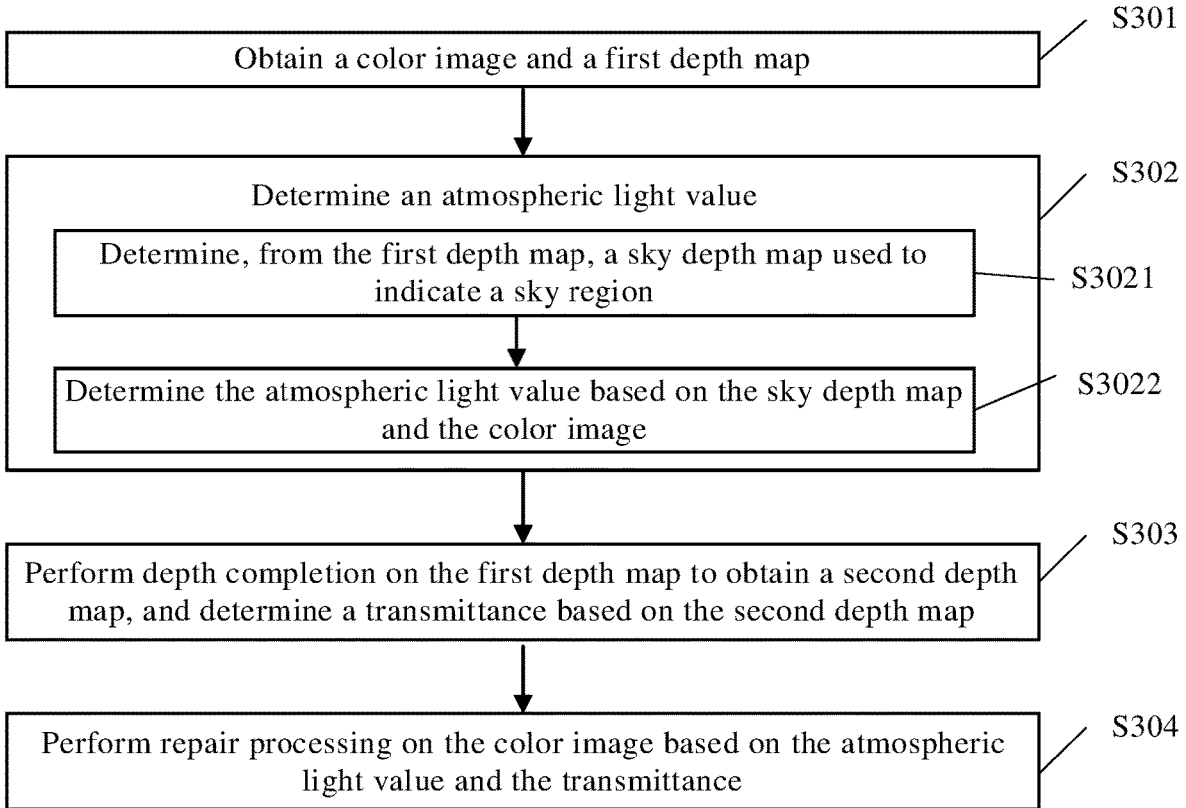
FIG. 3 shows an image processing method according to an embodiment of the disclosure.

FIG. 3 is an image processing method according to an embodiment of the disclosure. In the image processing method, repair processing is performed on a color image mainly by using depth information in a depth map to obtain an enhanced color image. The image processing method includes the following steps.

S301: Obtain the color image and a first depth map.

A depth sensor obtains the first depth map, and a camera obtains the color image. The color image may be an original color image.

It is worth mentioning that the color image and the first depth map may be obtained by simultaneously shooting a same scene at a same position with a color camera and the depth sensor that are matched and calibrated, and registering obtained two images, or may be obtained from a local memory or a local database as required, or may be received from an external data source (for example, the Internet, a server, or a database) by using an input apparatus or a transmission medium, or the like. The color image and the first depth map are images corresponding to each other. For example, the color image captured by the sensor and the first depth map may be projected to a same coordinate system through image registration, so that pixels of the two images are in a one-to-one correspondence. Considering that registration is a prior art, details are not described in the disclosure.

The depth sensor is configured to sense depth information of an environment, and a used technical solution may be one of monocular stereoscopic vision, binocular stereoscopic vision (Stereo), structure light, time of flight, laser radar (LiDAR), camera arrays, or another depth sensing technology. This is not limited herein. To describe the embodiments of the disclosure more clearly, the laser radar is used as the depth sensor in an embodiment of the disclosure.

The laser radar emits a laser beam using a laser transmitter, and then calculates a corresponding time at which the laser beam is reflected back to a laser receiver by the object, to infer a distance between the object and the laser radar. In addition, three-dimensional coordinates of a large quantity of dense points on a surface of a target object collected in this process are used to quickly determine a direction, a height, and even a shape of the object. However, the laser emitted by the laser transmitter to other distant regions, such as the sky, will not return to the laser receiver, so points in a corresponding region cannot be obtained.

S302: Determine an atmospheric light value.

The atmospheric light value may be determined based on the first depth map.

Further, it is determined based on the first depth map that the atmospheric light value includes S3021 and S3022.

S3021: Determine, from the first depth map, a sky depth map used to indicate a sky region.

The sky depth map may be determined from the first depth map by using a sliding window method.

First, a shape of the sliding window may be determined. In this embodiment of this application, the shape of the sliding window may be set to a rectangle with a size of one row of pixels, a step size of the sliding window is 1, and the rectangle with a size of one row of pixels is a rectangle with a width of the first depth map and a length of one pixel.

After the shape of the sliding window is determined, the sky depth map may be determined from the first depth map in a top-down sliding manner. A start position of the sliding window is at a top of the first depth map, a start row is used as an upper limit of the sky region, and an uppermost end of the sliding window is attached to an uppermost end of the first depth map. A sum of current pixel values in the sliding window and a quantity of current rows are recorded, and it is determined whether the sum of pixel values in the sliding window is zero. If the sum of pixel values is zero, the sliding window slides to a next row in the unit of step size. A sum of current pixel values of the sliding window and a quantity of current rows are re-recorded, and the sliding window slides down until it is found that a sum of pixel values of a sliding window in a row is not zero. Then, the row is used as a lower limit of the sky region, and a region formed by the upper limit of the sky region and the lower limit of the sky region is the sky depth map in the first depth map.

It should be noted that the shape of the sliding window is not limited in this application, which may be a rectangle, a circle, or in other shapes or a combination of other shapes. The disclosure does not limit the start position and a moving sequence of the sliding window either. The start position of the sliding window may be any area of the image, and the moving sequence of the sliding window may be from top to bottom, from bottom to top, from left to right, or from right to left.

S3022: Determine the atmospheric light value based on the sky depth map and the color image.

A binarization operation is performed on the first depth map using the sky depth map to obtain a binary map of the first depth map, then a sky color image used to indicate the sky region is determined based on the binary map and the color image. Finally, the atmospheric light value is determined based on the sky color image.

The binary map of the first depth map is an image including values of 0 and values of 1, where a pixel value of the sky region in the depth map corresponds to 1 in the binary map, and a pixel value of a non-sky region in the depth map corresponds to 0 in the binary map.

As for the sky color image that is used to indicate the sky region, and that is determined based on the binary map and the color image, a new color image may be obtained by multiplying the binary map of the first depth map with corresponding positions of pixel points in the color image, and the new color image is the sky color image used to indicate the sky region.

The determining the atmospheric light value based on the sky color image includes: first determining pixel points of a brightest part from the sky color image, where the pixel points of the brightest part are pixel points of a top brightness part in the sky color image, for example, 0.1% brightest pixel points; and determining an average value of the pixel points of the brightest part as the atmospheric light value. Generally, a range of the atmospheric light value is a grayscale value from 0 to 255, and a larger value indicates higher atmospheric radiance.

It should be noted that, in this application, another method for calculating an atmospheric light value may be combined with a manner for determining a transmittance provided in this embodiment of this application, to determine a finally repaired image.

S303: Perform depth completion on the first depth map to obtain a second depth map, and determine the transmittance based on the second depth map.

Because the first depth map is generally a sparse depth map, depth completion needs to be performed on the first depth map to obtain a dense depth map, that is, the second depth map. After the second depth map is determined, the transmittance is determined based on the second depth map. The sparse depth map generally refers to a depth map that includes a few non-zero pixels, and the dense depth map refers to a depth map that includes more non-zero pixels, that is, includes more non-zero pixels than the sparse depth map.

For ease of description, how to perform depth completion on the first depth map (that is, the sparse depth map) to obtain the second depth map (that is, the dense depth map) is not described herein. A depth completion technology is described in the following embodiment corresponding to FIG. 4.

The following further describes how to determine the transmittance based on the second depth map.

First, different atmospheric scattering coefficients $\beta \in \{0.4, 0.6, 0.8, 1.0, 1.4, 1.6\}$ are selected, and then the second depth map is used as depth information $d(x)$ and substituted into the following formula (2), to obtain the transmittance $t(x)$.

$$t(x) = e^{-\beta \cdot d(x)} \tag{2}$$

The transmittance may also be referred to as a transmittance coefficient or a transmittance ratio, and is a ratio of a transmittance light flux to an incident light flux with a value range of 0% to 100%.

S304: Perform repair processing on the color image based on the atmospheric light value and the transmittance.

Repair processing is performed on the color image (x) based on the atmospheric light value A and the transmittance t(x) by using the following atmospheric degradation model formula (3) to obtain a repaired image J(x), for example, a defogging/dehazing/desmoking image. The repair processing refers to performing related image processing on a to-be-repaired image, that is, an original color image, to obtain a clear color image, for example, repairing a color image including fog/haze/smoke to a defogging/dehazing/desmoking color image.

$$J(x) = \frac{I(x) - A(1 - t(x))}{t(x)} \tag{3}$$

In this embodiment, the depth map is used to determine the transmittance, and the depth map is a depth map obtained after depth completion, so that precision of the transmittance can be improved, thereby improving an image processing effect.

Figure 4:
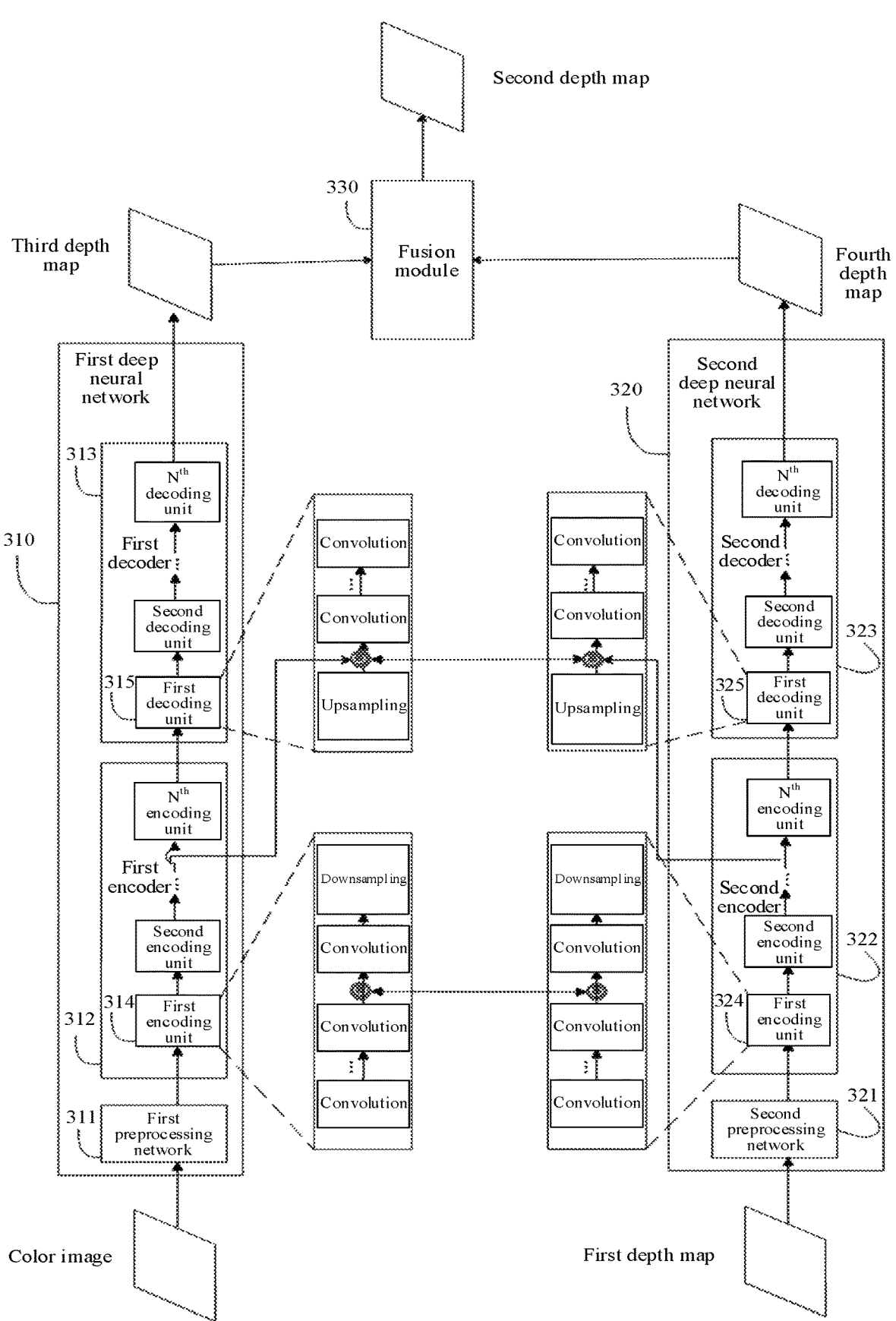
FIG. 4 is an implementation of performing depth completion on a depth map according to an embodiment of the disclosure.

FIG. 4 is an implementation of performing depth completion on a depth map according to an embodiment of the disclosure.

The color image and the first depth map are respectively input to a first deep neural network 310 and a second deep neural network 320 to obtain a third depth map and a fourth depth map, and then the third depth map and the fourth depth map are input to a fusion module 330 for fusion processing to obtain a second depth map, that is, a completed dense depth map.

The first deep neural network 310 and the second deep neural network 320 have a same structure.

The first deep neural network 310 includes a first preprocessing network 311, a first encoder 312, and a first decoder 313. The first preprocessing network 311 is configured to transform the color image that is input to the first deep neural network 310 into a first feature image suitable for processing by the first encoder 312, the first encoder 312 is configured to perform feature encoding on the first feature image, and the first decoder 313 is configured to perform feature decoding on a second feature image that is output by the first encoder 312. The first encoder 312 includes N downsampling actions, and the first decoder 313 includes N upsampling actions.

The second deep neural network 320 includes a second preprocessing network 321, a second encoder 322, and a second decoder 323. The second preprocessing network 321 is configured to transform the first depth map that is input to the second deep neural network 320 into a third feature image suitable for processing by the second encoder 322, the second encoder 322 is configured to perform feature encoding on the third feature image, and the second decoder 323 is configured to perform feature decoding on a fourth feature image that is output by the second encoder 322. The second encoder 322 includes N downsampling actions, and the second decoder 323 includes N upsampling actions.

The first deep neural network 310 obtains the third depth map based on the color image and some intermediate layer feature images in the second deep neural network 320. Therefore, the first deep neural network 310 includes two inputs, one input is the color image, and the other input is some feature images output from an intermediate layer in the second deep neural network 320. Output of the first deep neural network 310 is the third depth map.

The second deep neural network 320 obtains the fourth depth map based on the first depth map and some intermediate layer feature images in the first deep neural network 310. Therefore, the second deep neural network 320 includes two inputs, one input is the first depth map, and the other input is a feature image that is output from an intermediate layer of the first deep neural network 310. Output of the second deep neural network 320 is the depth map.

The fusion module 330 may be configured to fuse the third depth map that is output by the first deep neural network 310 and the fourth depth map that is output by the second deep neural network 320, to generate a completed second depth map.

An implementation of a fusion operation may include: performing concat processing on the third depth map and the fourth depth map, and then performing at least one convolution operation on a concatenated image to obtain the completed second depth map.

Implementation steps of the first deep neural network 310 and the second deep neural network 320 are further described below.

An implementation process of the first deep neural network 310 is first described.

S11: The first preprocessing network 311 preprocesses the color image to obtain the first feature image.

The first preprocessing network 311 may be configured to: transform the color image that is input into the first feature image suitable for processing by the first encoder 312, and input the first feature image to the first encoder 312. The first preprocessing network 311 may include at least one convolutional layer. The first preprocessing network 311 performs convolution processing on the color image, so that a quantity of channels of the color image is changed without changing a size of the color image.

It may be understood that the color image that is input to the first deep neural network is in an RGB format. In this case, the quantity of channels of the color image is 3, which are respectively R (red), G (green), and B (blue). For example, if a size of the color image that is input is h*w*3, after the color image is processed by the first preprocessing network 311, a size of the first feature image that is output is h*w*16.

A quantity of channels of the first feature image that is output after the color image is processed by the first preprocessing network 311 is consistent with a quantity of channels of the third feature image.

S12: Input the first feature image to the first encoder 312 to obtain the second feature image.

The first feature image is input to the first encoder 312. The first encoder 312 may include N encoding units. All encoding units have a same structure and same encoding steps.

A first encoding unit 314 in the first encoder 312 is used as an example. The first encoding unit 314 includes at least one convolutional layer and a downsampling layer. The convolutional layer is used to extract a feature, and an operation of the convolutional layer does not change a size of a feature image that is input. A feature image that is output from the at least one convolutional layer may be stored, and the feature image that is output from the at least one convolutional layer and a feature image generated at an intermediate layer in the second deep neural network 320 are concatenated. A symbol ◉ in FIG. 4 indicates concat. The feature image generated at the intermediate layer in the second deep neural network 320 may be a feature map generated after an operation of a convolutional layer in an encoding unit 324 of the second encoder 322 in the second deep neural network 320. A quantity of channels of a feature image that is output after a concat operation is doubled. Then, a concatenated feature image is input to a convolutional layer (for example, a 1*1 convolutional layer) used to implement channel dimension reduction, to reduce a quantity of channels of the concatenated feature image to a quantity of channels before concat. Finally, downsampling processing is performed on a feature image that is output after being processed in the convolutional layer.

It should be noted that a structure of the first encoding unit 314 shown in FIG. 4 is merely an example. In practice, the structure of the encoding unit may be adjusted to some extent, for example, a quantity of convolutional layers is adjusted. This is not limited in this application.

In this application, a quantity N of encoding units in the first encoder 312 is not limited, and a quantity of convolutional layers and a downsampling coefficient in each encoding unit are not limited.

To make the foregoing steps clearer, an example is used for description herein.

For example, a first feature image with a size of h*w*16 is input to the first encoder 312, where 16 is a channel quantity, h is a pixel length, and w is a pixel width. A size of a feature image that is output after features are extracted from the feature image by all convolutional layers is h*w*16. Then, the feature image that is output in the previous step and the feature image generated at the intermediate layer in the second deep neural network 320 are concatenated, and a quantity of channels of a feature image that is output is doubled, that is, a size of the image is h*w*32. Then, the feature image that is output in the previous step is input to a 1*1 convolutional layer. The convolutional layer is used to reduce the quantity of channels of the concatenated feature image to 16, that is, the size is changed to h*w*16 again. Finally, after downsampling processing with a downsampling coefficient of ½ is performed on the feature image that is output in the previous step, a pixel length h is changed to ½ of an original pixel length, a pixel width w is changed to ½ of an original pixel width, and a quantity of channels is doubled, that is, a feature image with a size of ½h*½*w*32 is obtained.

S13: Input the second feature image to the first decoder 313 to obtain the third depth map.

The second feature image that is output by the first encoder 312 is input to the first decoder 313, and the first decoder 313 outputs the third depth map. The first decoder 313 may include N decoding units, where N is an integer greater than 1. A value of N is not limited in this application.

In the first decoder 313, all decoding units may have a same structure and same decoding steps. A first decoding unit 315 in the first decoder 313 is used as an example, and the first decoding unit 315 includes one upsampling layer and at least one convolutional layer. First, upsampling processing is performed on the second feature image to obtain an output feature image generated after upsampling, and then a feature image generated after upsampling, the feature map generated at the intermediate layer in the first encoder 312, and the feature map generated at the intermediate layer of the second decoder 323 in the second deep neural network 320 are concatenated. Then, a concatenated feature image is first input to a convolutional layer that can implement channel dimension reduction, for example, a 1*1 convolutional layer, and then an output feature image obtained after channel dimension reduction is input to at least one convolutional layer. All convolutional layers included in the first decoding unit 315 are used to extract features and do not change a size of a feature image that is input. In addition, the feature image generated after upsampling is provided for a decoding unit of the second decoder 323 of the second deep neural network 320 for concat processing.

It should be noted that a structure of the first decoding unit 315 shown in FIG. 4 is merely an example. In practice, the structure of the decoding unit may be adjusted to some extent, for example, a quantity of convolutional layers is adjusted. This is not limited in this application.

In the disclosure, a quantity N of decoding units in the first decoder 313 is not limited, and a quantity of convolutional layers and an upsampling coefficient in each decoding unit are not limited. To make the foregoing steps clearer, an example is used for further description herein.

For example, a second feature image 317 with a size of ⅛h*⅛w*128 is input to the first decoder 313. After the feature image is input to an upsampling convolutional layer with an upsampling coefficient of ½, a pixel length of ⅛h is changed to ¼h, a pixel width of ⅛w is changed to ¼h of an original pixel width, and a quantity of channels is changed to half of an original quantity, that is, a feature image with a size of ¼h*¼w*64 is obtained. Then, the feature image that is output in the previous step, the feature map generated at the intermediate layer of the first encoder 312 in the first deep neural network 310, and the feature map generated at the intermediate layer of the second decoder 323 in the second deep neural network 320 are concatenated, and a quantity of channels of a concatenated feature image that is output is increased by two times, that is, a size of the feature image that is output is ¼h*¼w*192. Then, the feature image that is output in the previous step is input to a 1*1 convolutional layer. The convolutional layer is used to reduce the quantity of channels of the concatenated feature image to a quantity of channels before concat, that is, the size is changed to ¼h*¼w*64 again. Finally, a size of a feature image that is output after features are extracted by all convolutional layers is ¼h*¼w*64.

Next, an implementation process of the second deep neural network 320 is described.

S21: The second preprocessing network 321 preprocesses the first depth map to obtain the third feature image.

The second preprocessing network 321 may be configured to: transform the first depth map that is input into the third feature image suitable for processing by the second encoder 322, and input the third feature image to the second encoder 322. The second preprocessing network 321 may include at least one convolutional layer, and the second preprocessing network 321 performs convolution processing on the first depth map, so that a quantity of channels of the first depth map is changed, but a size of the first depth map is not changed.

It may be understood that the first depth map that is input to the second neural network has only one channel quantity, that is, a grayscale value. The grayscale value indicates a distance between a pixel point in the scene and a depth sensor. For example, if the size of the first depth map that is input is h*w*1, after the first depth map is processed by the second preprocessing network 321, the size of the third feature image that is output is h*w*16.

A quantity of channels of the third feature image that is output after the first depth map is processed by the second preprocessing network 321 is consistent with a quantity of channels of the first feature image.

S22: Input the third feature image to the second encoder 322 to obtain the fourth feature image.

The third feature image is input to the second encoder 322. The second encoder 322 may include N encoding units. All encoding units have a same structure and same encoding steps.

Figure 5:
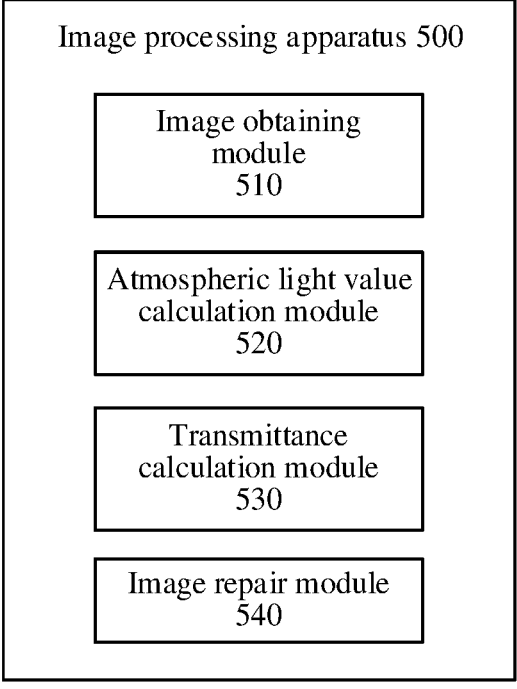
FIG. 5 is a diagram of an image processing apparatus according to an embodiment of the disclosure.

The second encoding unit 324 in the second encoder 322 is used as an example. The second encoder 322 includes at least one convolutional layer and a sampling layer. The convolutional layer is used to extract a feature, and an operation of the convolutional layer does not change a size of a feature image that is input. A feature image that is output from the at least one convolutional layer may be stored, and the feature image that is output from the at least one convolutional layer and a feature image generated at an intermediate layer in the first deep neural network 310 are concatenated. The feature image generated at the intermediate layer in the first deep neural network 310 may be a feature image generated after an operation of a convolutional layer in the encoding unit 314 of the first encoder 312 in the first deep neural network 310. A quantity of channels of a feature image that is output after a concat operation is doubled. Then, a concatenated feature image is input to a convolutional layer (for example, a 1*1 convolutional layer) used to implement channel dimension reduction, to reduce a quantity of channels of the concatenated feature image to a quantity of channels before concat. Finally, downsampling processing is performed on a feature image that is output after being processed in the convolutional layer. It should be noted that a structure of the second encoding unit 324 shown in FIG. 5 is merely an example. In practice, the structure of the encoding unit may be adjusted to some extent, for example, a quantity of convolutional layers is adjusted. This is not limited in this application.

In this application, a quantity N of encoding units in the second encoder 322 is not limited, and a quantity of convolutional layers and a downsampling coefficient in each encoding unit are not limited.

To make the foregoing steps clearer, an example is used for description herein.

For example, a third feature image with a size of $h*w*16$ is input to the second encoder 322, where 16 is a channel quantity, h is a pixel length, and w is a pixel width. A size of a feature image that is output after features are extracted from the third feature image by all convolutional layers is $h*w*16$. Then, the feature image that is output in the previous step and the feature image generated at the intermediate layer in the first deep neural network 310 are concatenated, and a quantity of channels of a feature image that is output is doubled, that is, a size of the image is $h*w*32$. Then, the feature image that is output in the previous step is input to a 1*1 convolutional layer. The convolutional layer is used to reduce the quantity of channels of the concatenated feature image to 16, that is, the size is changed to $h*w*16$ again. Finally, after downsampling processing with a downsampling coefficient of ½ is performed on the feature image that is output in the previous step, a pixel length h is changed to ½ of an original pixel length, a pixel width w is changed to ½ of an original pixel width, and a quantity of channels is doubled, that is, a feature image with a size of $\frac{1}{2}h*\frac{1}{2}w*32$ is obtained.

S23: Input the fourth feature image to the second decoder 323 to obtain the fourth depth map.

The fourth feature image is input to the second decoder 323, and the second decoder 323 outputs the fourth depth map. The second decoder 323 may include N decoding units, where N is an integer greater than 1. A value of N is not limited in this application.

In the second decoder 323, all decoding units may have a same structure and same decoding steps. A second decoding unit 325 in the second decoder 323 is used as an example, and the second decoding unit 325 includes one upsampling layer and at least one convolutional layer. First, upsampling processing is performed on the fourth feature image to obtain an output feature image generated after upsampling, and then a feature image generated after upsampling, the feature map generated at the intermediate layer in the second encoder 322, and the feature map generated at the intermediate layer of the first decoder 313 in the first deep neural network 310 are concatenated. Then, a concatenated feature image is first input to a convolutional layer that can implement channel dimension reduction, for example, a 1*1 convolutional layer, and then an output feature image obtained after channel dimension reduction is input to at least one convolutional layer. All convolutional layers included in the second decoding unit 325 are used to extract features and do not change a size of a feature image that is input. In addition, the feature image generated after upsampling is provided for a decoding unit of the first decoder 313 of the first deep neural network 310 for concat processing.

It should be noted that a structure of the second decoding unit 325 shown in FIG. 4 is merely an example. In practice, the structure of the decoding unit may be adjusted to some extent, for example, a quantity of convolutional layers is adjusted. This is not limited in this application.

In the disclosure, a quantity N of decoding units in the second decoder 323 is not limited, and a quantity of convolutional layers and an upsampling coefficient in each decoding unit are not limited. To make the foregoing steps clearer, an example is used for further description herein.

For example, a fourth feature image with a size of $\frac{1}{8}h*\frac{1}{8}w*128$ is input to the second decoder 323. After the feature image is input to an upsampling convolutional layer with an upsampling coefficient of ½, a pixel length of $\frac{1}{8}h$ is changed to $\frac{1}{4}h$, a pixel width of $\frac{1}{8}w$ is changed to $\frac{1}{4}h$ of an original pixel width, and a quantity of channels is changed to half of an original quantity, that is, a feature image with a size of $\frac{1}{4}h*\frac{1}{4}w*64$ is obtained. Then, the feature image that is output in the previous step, the feature map generated at the intermediate layer of the first decoder 313 in the first deep neural network 310, and the feature map generated at the intermediate layer of the second encoder 322 in the second deep neural network 320 are concatenated, and a quantity of channels of a concatenated feature image that is output is increased by two times, that is, a size of the feature image that is output is $\frac{1}{4}h*\frac{1}{4}w*192$. Then, the feature image that is output in the previous step is input to a 1*1 convolutional layer. The convolutional layer is used to reduce the quantity of channels of the concatenated feature image to a quantity of channels before concat, that is, the size is changed to $\frac{1}{4}h*\frac{1}{4}w*64$ again. Finally, a size of a feature image that is output after features are extracted by all convolutional layers is $\frac{1}{4}h*\frac{1}{4}w*64$.

Further, the foregoing depth completion is implemented by performing inference by using mainly the first deep neural network and the second deep neural network. The following further describes how to train the first deep neural network and the second deep neural network. The following uses training the first deep neural network as an example, and a training manner of the second deep neural network is similar.

First, an initial first deep neural network is established, and a parameter of the initial first deep neural network is initialized. For example, an initialization parameter may be a random value.

Second, a training sample is obtained, where the training sample is a color image and a registered depth information image. The training sample may be obtained from an actual scenario by using a camera and a depth sensor, or may be an open-source color image and a registered depth map obtained from a database. If a quantity of training samples is insufficient, the training sample may also be used to perform data enhancement on a training set by performing operations on a sample such as fuzzification, tailoring, noise addition, and using an adversarial network to generate a training sample.

Then, a loss function and an optimizer are determined. A mean square error may be used to calculate a value of the loss function, that is, a quadratic sum of a difference between a depth map that is output from a network and a real depth map, to evaluate a degree of proximity between a predicted depth map and a truth depth map. The optimizer may be an adam optimizer, used to update a parameter in the network through back propagation in neural network training. By continuously iteratively updating the parameter in the network, the predicted depth map is close to the real depth map. When the value of the loss function does not change anymore, the training ends.

Figure 6:
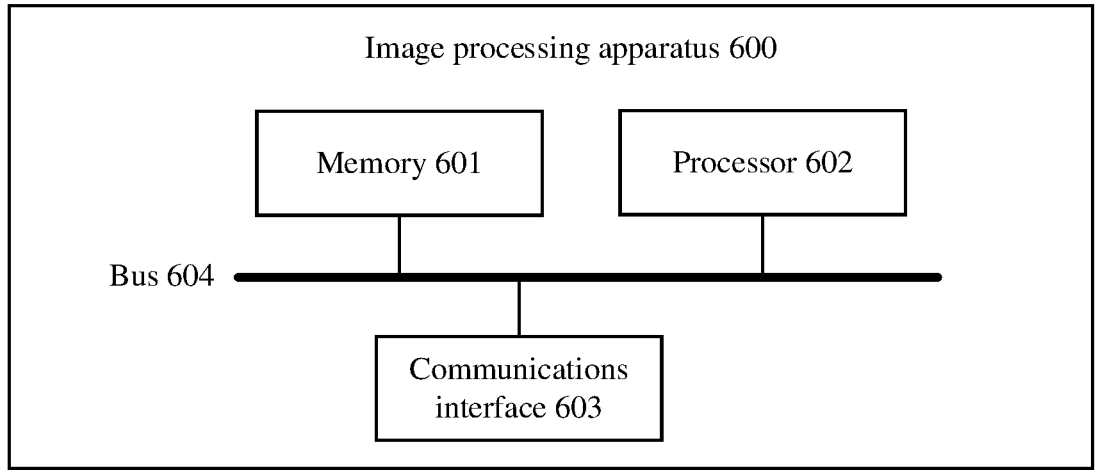
FIG. 6 is a diagram of an image processing apparatus according to another embodiment of the disclosure.

FIG. 5 and FIG. 6 are diagrams of image processing apparatuses according to an embodiment of this application. These image processing apparatuses may be configured to implement beneficial effects of the foregoing method embodiments.

As shown in FIG. 5, an image processing apparatus 500 includes an image obtaining module 510, an atmospheric light value calculation module 520, a transmittance calculation module 530, and an image repair module 540. When the image processing apparatus 500 is configured to implement functions of the method embodiment shown in FIG. 3, the image obtaining module 510 is configured to perform S301, the atmospheric light value calculation module 520 is configured to perform S302, the transmittance calculation module 530 is configured to perform S303, and the image repair module 540 is configured to perform S304. For more detailed descriptions of the image obtaining module 510, the atmospheric light value calculation module 520, the transmittance calculation module 530, and the image repair module 540, directly refer to related descriptions in the method embodiment shown in FIG. 3. Details are not described herein again.

It should be understood that unit division of the image processing apparatus 500 is merely logical function division.

FIG. 6 is a diagram of an image processing apparatus according to an embodiment of this application. An image processing apparatus 600 shown in FIG. 6 includes a memory 601, a processor 602, a communications interface 603, and a bus 604. Communication connections between the memory 601, the processor 602, and the communications interface 603 are implemented by using the bus 604.

The memory 601 may be a ROM, a static storage device, or a RAM. The memory 601 may store a program. When the program stored in the memory 601 is executed by the processor 602, the processor 602 and the communications interface 603 are configured to perform steps of the image processing method in the embodiments of this application.

The processor 602 may be a general-purpose CPU, a microprocessor, an ASIC, a GPU, or one or more integrated circuits, and is configured to execute a related program, to implement a function that needs to be performed by a unit in the image processing apparatus in this embodiment of this application, or perform the image processing method in the method embodiments of this application.

The processor 602 may alternatively be an integrated circuit chip and has a signal processing capability. In an implementation process, the steps of the image processing method in this embodiment of this application may be completed by using an integrated logic circuit of hardware in the processor 602 or an instruction in a form of software.

Alternatively, the processor 602 may be a general-purpose processor, a DSP, an ASIC, an FPGA or another programmable logic device, a discrete gate or transistor logic device, or a discrete hardware component. It may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 4001. The processor 602 reads information in the memory 601, and completes, in combination with hardware of the processor 602, functions that need to be performed by the units included in the image processing apparatus in this embodiment of this application, or performs the image processing method in the method embodiments of this application.

The communications interface 603 uses a transceiver apparatus, for example, but not limited to, a transceiver, to implement communication between the apparatus 600 and another device or a communications network. For example, a to-be-processed image may be obtained through the communications interface 603.

The bus 604 may include a channel through which information is transmitted between parts (for example, the memory 601, the processor 602, and the communications interface 603) of the apparatus 600.

It should be understood that, the processor in the embodiments of this application may be a central processing unit (CPU). The processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be understood that the memory in the embodiments of this application may be a volatile memory or a nonvolatile memory, or may include both the volatile memory and the nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through an example rather than a limitative description, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), or a direct rambus random access memory (DR RAM).

All or some of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, microwave, or the like) manner. The computer-readable storage medium may be any usable medium accessible by a computer or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, "at least one" means one or more, and "a plurality of" means two or more. "At least one of the following items (pieces)" or a similar expression thereof refers to any combination of these items, including any combination of singular or plural items (pieces). For example, at least one of a, b, or c may indicate: a, b, c, a-b, a-c, b-c, or a-b-c, where a, b, and c may exist alone or in parallel.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image processing method, comprising:
obtaining, by an image processing apparatus, a first depth map and a color image, the first depth map and the color image being for a same scene;

determining, by the image processing apparatus, an atmospheric light value;

performing, by the image processing apparatus, depth completion on the first depth map to obtain a second depth map, wherein performing the depth completion on the first depth map to obtain the second depth map comprises:

provide the color image and a second intermediate feature image to a first deep neural network to obtain a third depth map, wherein the second intermediate feature image is generated at an intermediate layer of a second deep neural network;

providing the first depth map and a first intermediate feature image to the second deep neural network to obtain a fourth depth map, wherein the first intermediate feature image is generated at an intermediate layer of the first deep neural network; and performing a fusion operation on the third depth map and the fourth depth map to obtain the second depth map;

determining, by the image processing apparatus, a transmittance based on the second depth map; and performing, by the image processing apparatus, repair processing on the color image based on the atmospheric light value and the transmittance.

2. The image processing method according to claim 1, wherein the first deep neural network comprises a first preprocessing network, a first encoder, and a first decoder, wherein the first preprocessing network is configured to transform a color image that is input to the first deep neural network into a first feature image suitable for processing by the first encoder, wherein the first encoder is configured to perform feature encoding on the first feature image, and wherein the first decoder is configured to perform feature decoding on a second feature image that is output by the first encoder.

3. The image processing method according to claim 2, wherein the first intermediate feature image comprises a convolutional layer feature image generated at a convolutional layer in an encoding unit of the first encoder and an upsampling layer feature image generated at an upsampling layer in a decoding unit of the first decoder.

4. The image processing method according to claim 1, wherein the second deep neural network comprises a second preprocessing network, a second encoder, and a second decoder, wherein the second preprocessing network is configured to transform a first depth map that is input to the second deep neural network into a third feature image suitable for processing by the second encoder, wherein the second encoder is configured to perform feature encoding on the third feature image, and wherein the second decoder is configured to perform feature decoding on a fourth feature image that is output by the second encoder.

5. The image processing method according to claim 4, wherein the second intermediate feature image comprises a convolutional layer feature image generated at a convolutional layer in an encoding unit of the second encoder and an upsampling layer feature image generated at an upsampling layer in a decoding unit of the second decoder.

6. The image processing method according to claim 1, wherein determining the atmospheric light value is based on the first depth map.

7. The image processing method according to claim 6, wherein determining the atmospheric light value based on the first depth map comprises:

determining, from the first depth map, a sky depth map used to indicate a sky region; and determining the atmospheric light value based on the sky depth map and the color image.

8. The image processing method according to claim 7, wherein determining the sky depth map uses a sliding window method.

9. The image processing method according to claim 8, wherein a window shape of a sliding window used in the sliding window method is a rectangle with a size of one row of pixels, and a step size of the sliding window is 1.

10. The image processing method according to claim 7, wherein determining the atmospheric light value based on the sky depth map and the color image comprises:

determining, from the color image using the sky depth map, a sky color image used to indicate the sky region; and determining the atmospheric light value based on the sky color image.

11. The image processing method according to claim 10, wherein determining the sky color image comprises:

performing a binarization operation on the first depth map using the sky depth map to obtain a binary map; and determining, based on the binary map and the color image, the sky color image.

12. The image processing method according to claim 10, wherein determining the atmospheric light value based on the sky color image comprises:

determining pixel points of a brightest part of the sky color image; and determining, as the atmospheric light value, an average value of the pixel points of the brightest part of the sky color image.

13. An image processing apparatus, comprising:

a memory storing instructions; and at least one processor in communication with the memory, wherein the at least one processor is configured, upon execution of the instructions, to perform the following-steps:

obtain a first depth map and a color image, the first depth map and the color image being for a same scene;

determine an atmospheric light value;

perform depth completion on the first depth map to obtain a second depth map, wherein performing the depth completion on the first depth map to obtain the second depth map comprises:

providing the color image and a second intermediate feature image to a first deep neural network to obtain a third depth map, wherein the second intermediate feature image is generated at an intermediate layer of a second deep neural network;

providing the first depth map and a first intermediate feature image to the second deep neural network to obtain a fourth depth map, wherein the first intermediate feature image is generated at an intermediate layer of the first deep neural network; and performing a fusion operation on the third depth map and the fourth depth map to obtain the second depth map;

determine a transmittance based on the second depth map; and perform repair processing on the color image based on the atmospheric light value and the transmittance.

14. The image processing apparatus according to claim 13, wherein the first deep neural network comprises a first preprocessing network, a first encoder an a first decoder, wherein the first preprocessing network is configured to transform a color image that is input to the first deep neural network into a first feature image suitable for processing by the first encoder, wherein the first encoder is configured to perform feature encoding on the first feature image, and wherein the first decoder is configured to perform feature decoding on a second feature image that is output by the first encoder.

15. The image processing apparatus according to claim 14, wherein the first intermediate feature image comprises a convolutional layer feature image generated at a convolutional layer in an encoding unit of the first encoder and an upsampling layer feature image generated at an upsampling layer in a decoding unit of the first decoder.

16. The image processing apparatus according to claim 13, wherein the second deep neural network comprises a second preprocessing network, a second encoder, and a second decoder, wherein the second preprocessing network is configured to transform a first depth map that is input to the second deep neural network into a third feature image suitable for processing by the second encoder, wherein the second encoder is configured to perform feature encoding on the third feature image, and wherein the second decoder is configured to perform feature decoding on a fourth feature image that is output by the second encoder.

17. The image processing apparatus according to claim 13, wherein determining the atmospheric light value is based on the first depth map.

18. A non-transitory computer-readable medium having processor-executable instructions stored thereon for image processing, wherein the processor-executable instructions, when executed, facilitate performance of the following:

obtaining a first depth map and a color image, the first depth map and the color image being for a same scene;

determining an atmospheric light value;

performing depth completion on the first depth map to obtain a second depth map, wherein performing the depth completion on the first depth map to obtain the second depth map comprises:

providing the color image and a second intermediate feature image to a first deep neural network to obtain a third depth map, wherein the second intermediate feature image is generated at an intermediate layer of a second deep neural network;

providing the first depth map and a first intermediate feature image to the second deep neural network to obtain a fourth depth map, wherein the first intermediate feature image is generated at an intermediate layer of the first deep neural network; and performing a fusion operation on the third depth map and the fourth depth map to obtain the second depth map;

determining a transmittance based on the second depth map; and performing repair processing on the color image based on the atmospheric light value and the transmittance.

19. The non-transitory computer-readable medium according to claim 18, wherein the first deep neural network comprises a first preprocessing network, a first encoder, and a first decoder, wherein the first preprocessing network is configured to transform a color image that is input to the first deep neural network into a first feature image suitable for processing by the first encoder, wherein the first encoder is configured to perform feature encoding on the first feature image, and wherein the first decoder is configured to perform feature decoding on a second feature image that is output by the first encoder; and wherein the second deep neural network comprises a second preprocessing network, a second encoder, and a second decoder, wherein the second preprocessing network is configured to transform a first depth map that is input to the second deep neural network into a third feature image suitable for processing by the second encoder, wherein the second encoder is configured to perform feature encoding on the third feature image, and wherein the second decoder is configured to perform feature decoding on a fourth feature image that is output by the second encoder.

20. The non-transitory computer-readable medium according to claim 18, wherein determining the atmospheric light value is based on the first depth map.

* * * * *